(12) United States Patent
Ducellier

(10) Patent No.: US 7,302,134 B2
(45) Date of Patent: Nov. 27, 2007

(54) WAVELENGTH SELECTIVE SWITCH WITH A 2D ARRANGEMENT OF OPTICAL PORTS

(75) Inventor: Thomas Ducellier, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/477,478

(22) Filed: Jun. 30, 2006

(65) Prior Publication Data

US 2006/0245685 A1  Nov. 2, 2006

Related U.S. Application Data

(63) Continuation of application No. 10/493,109, filed on Apr. 20, 2004, now Pat. No. 7,088,882.

(60) Provisional application No. 60/381,376, filed on May 20, 2002.

(51) Int. Cl.
*G02B 6/26* (2006.01)

(52) U.S. Cl. .......................................... 385/24; 385/18

(58) Field of Classification Search .................. None
See application file for complete search history.

(56) References Cited

U.S. PATENT DOCUMENTS

| 6,097,859 | A * | 8/2000 | Solgaard et al. ............... 385/17 |
| 7,088,882 | B2 * | 8/2006 | Ducellier et al. .............. 385/17 |
| 2002/0076146 | A1 * | 6/2002 | Lyer et al. ..................... 385/24 |
| 2005/0213877 | A1 * | 9/2005 | Wu et al. ....................... 385/18 |

* cited by examiner

*Primary Examiner*—Rodney Bovernick
*Assistant Examiner*—Mike Stahl
(74) *Attorney, Agent, or Firm*—Teitelbaum & MacLean; Neil Teitelbaum; Doug MacLean

(57) ABSTRACT

A wavelength cross connect is provided in which wavelength channels are individually switchable from one of a first set of ports to one of a second set of ports. Add and drop capability is provided on the sets of ports. Some embodiments feature a single row of ports, while others feature two dimensional arrays of ports. Some embodiments employ one dispersive element per port, and others employ one dispersive element per row of ports. Embodiments featuring transmissive and non-transmissive switching elements are provided.

12 Claims, 13 Drawing Sheets

WAVELENGTH SELECTIVE SWITCH WITH A 2D ARRANGEMENT OF OPTICAL PORTS

RELATED APPLICATION

This application is a continuation of U.S. patent application Ser. No. 10/493,109 filed Apr. 20, 2004 now U.S. Pat. No. 7,088,882, which claims the benefit of U.S. Provisional Application No. 60/381,376 filed May 20, 2002 hereby incorporated by reference in its entirety.

FIELD OF THE INVENTION

This invention relates to the field of DWDM fibre optics telecommunications and in particular to the field of all-optical switching.

BACKGROUND OF THE INVENTION

The advent of DWDM fibre optics telecommunications systems in the early 1990s have enabled a dramatic increase in the transmission capacity over point-to-point links. This was achieved through multiplexing of a large number of individually modulated light beams of different wavelengths onto the same optical fibre. Typical systems installed today would have 64 or more independent channels precisely aligned onto an ITU-T standardized grid at 100 GHz, 50 GHz or even narrower channel spacing. With routine modulation speeds of 10 Gb/s and attaining 40 Gb/s in laboratory experiments, it is not unusual to obtain aggregated capacities in the order of several terabits per second of information being transmitted onto a single optical fibre (S. Bigo, Optical Fibre Communications conference, WX 3, pp. 362-364, Anaheim, 2002). At the same time, electrical switching capacities have been growing at a much slower rate, with current largest electrical switch matrices limited to typically 640 Gb/s in a single stage. Furthermore, the cost of converting the signal from optical to electrical for switching and then back from electrical to optical becomes prohibitively expensive as the number of optical channel increases. All optical switching technologies are therefore becoming more and more attractive to manage the enormous bandwidth being transmitted over optical fibres.

A typical all-optical switch would consist of a large core all-optical switch matrix surrounded by DWDM demultiplexers and multiplexers at each fibre interface. However, for large number of wavelengths channels per optical fibre, this leads to a very large switching core size: for example, a 50 GHz channel spacing system with 128 channels per fibre would require a 1024×1024 switching matrix to switch traffic between 8 incoming fibres to 8 outgoing fibres on a per wavelength basis. Large optical switching matrices are hard to fabricate, complex to control, require overwhelming fibre management and are very expensive. Furthermore, in the absence of wavelength conversion, only a sub-set of the switching matrix capacity is actually in use: each wavelength being switched independently, only 128 8×8 independent connections are used in the 1024×1024 available (0.8% of the overall switching capacity). This huge inefficiency is the primary reason for considering a wavelength switching architecture in which the DWDM demultiplexing and multiplexing are integrated with the switching function.

An example of a wavelength selective all-optical switch is called a wavelength selective cross-connect WSXC (R. E. Wagner, Journal of Lightwave Technology, Vol. 14, No. 6, June 1996, also U.S. Pat. No. 6,097,859) by Solgaard et al. Such a device generally has N incoming fibres and N outgoing fibres, each fibre being capable of transporting M wavelength channels. The WXC enables independent switching of each of the M wavelength channels from the N incoming fibres to the N outgoing fibres. It is functionally equivalent to an input array of N wavelength demultiplexers routed to an output array of N wavelength multiplexers through an array of M N×N optical switches. In such a WXC, there are M×N×N possible optical paths, which is exactly the required flexibility in the absence of wavelength conversion. For example, in the case mentioned above of a 128 channel system at 50 GHz spacing with 8 fibres in and 8 fibres out, the standard large optical core based switch would have over a million possible connections, whereas only 8192 are needed, which is exactly what the WXC architecture enables (128×8×8).

SUMMARY OF THE INVENTION

According to one broad aspect, the invention provides a wavelength cross connect comprising: a first plurality of lenses stacked vertically; a second plurality of lenses stacked vertically, spaced from said first plurality of lenses, non-overlapping in vertical space with said first plurality of lenses; a first plurality of dispersive elements, with one dispersive element substantially in a first focal plane of each of said first plurality of lenses; a second plurality of dispersive elements, with one dispersive element substantially in a second focal plane of each of said second plurality of lenses; a first array of micro-mirrors tiltable in two directions, the first array being substantially in a second focal plane of each of said first plurality of lenses; a second array of micro-mirrors tiltable in two directions, the second array being substantially in a first focal plane of each of said second plurality of lenses; in a first plurality of optical ports a respective optical port positioned to input light onto/receive light from each of said first plurality of lenses; in a second plurality of optical ports a respective optical port positioned to input light onto/receive light from each of said second plurality of lenses; wherein light entering any of said first plurality of optical ports or said second plurality of ports is switchable to any of the first plurality of optical ports and any of said second plurality of optical ports.

In some embodiments, the switching elements are MEMS switching elements.

In some embodiments, each first bulk optical element is selected from a group consisting of a lens or a curved mirror.

In some embodiments, the dispersive element is selected from a group consisting of: a diffraction grating, either reflection and transmission type, prisms.

According to another broad aspect, the invention provides a wavelength cross connect comprising: a first plurality of lenses stacked vertically; a second plurality of lenses stacked vertically, spaced from said first plurality of lenses, non-overlapping in vertical space with said first plurality of lenses; a first dispersive element at least part of which is substantially in a first focal plane of each of said first plurality of lenses; a second dispersive element at least part of which is substantially in a second focal plane of each of said second plurality of lenses; a first array of micro-mirrors tiltable in two directions, the first array being substantially in a second focal plane of each of said first plurality of lenses; a second array of micro-mirrors tiltable in two directions, the second array being substantially in a first focal plane of each of said second plurality of lenses; in a first plurality of optical ports a respective optical port positioned to input light onto/receive light from each of said first plurality of lenses; in a second plurality of optical ports a respective optical port positioned to input light onto/receive light from each of said second plurality of lenses; wherein light entering any of said first plurality of optical ports or said second plurality of ports is switchable to any of the first plurality of optical ports and any of said second plurality of optical ports.

In some embodiments, the switching elements are MEMS switching elements.

In some embodiments, each first bulk optical element is selected from a group consisting of a lens or a curved mirror.

In some embodiments, the dispersive element is selected from a group consisting of: a diffraction grating, either reflection and transmission type, prisms.

According to another broad aspect, the invention provides a wavelength cross connect comprising: a first plurality of lenses stacked vertically; a second plurality of lenses stacked vertically, spaced from said first plurality of lenses, non-overlapping in vertical space with said first plurality of lenses; a first plurality of dispersive elements, with one dispersive element substantially in a first focal plane of each of said first plurality of lenses; a second plurality of dispersive elements, with one dispersive element substantially in a second focal plane of each of said second plurality of lenses; a first array of transmissive switching elements controllable in two directions, the first array being substantially in a second focal plane of each of said first plurality of lenses; a second array of transmissive switching elements controllable in two directions, the second array being substantially in a first focal plane of each of said second plurality of lenses; in a first plurality of optical ports a respective optical port positioned to input light onto/receive light from each of said first plurality of lenses; in a second plurality of optical ports a respective optical port positioned to input light onto/receive light from each of said second plurality of lenses; wherein light entering any of said first plurality of optical ports or said second plurality of ports is switchable to any of the first plurality of optical ports and any of said second plurality of optical ports.

In some embodiments, the switching elements are MEMS switching elements.

In some embodiments, each first bulk optical element is selected from a group consisting of a lens or a curved mirror.

In some embodiments, the dispersive element is selected from a group consisting of: a diffraction grating, either reflection and transmission type, prisms.

According to another broad aspect, the invention provides a wavelength cross connect comprising: a first plurality of lenses stacked vertically; a second plurality of lenses stacked vertically, spaced from said first plurality of lenses, non-overlapping in vertical space with said first plurality of lenses; a first plurality of dispersive elements, with one dispersive element substantially in a first focal plane of each of said first plurality of lenses; a second plurality of dispersive elements, with one dispersive element substantially in a second focal plane of each of said second plurality of lenses; a first array of micro-mirrors tiltable in two directions, the first array being substantially in a second focal plane of each of said first plurality of lenses; a second array of micro-mirrors tiltable in two directions, the second array being substantially in a first focal plane of each of said second plurality of lenses; a first two dimensional array of optical ports; a second two dimensional array of optical ports; for each row of said first two dimensional array of optical ports, a respective first bulk optical element having optical power and having a fourth focal plane substantially coplanar with said first focal plane of said second plurality of lenses; for each row of said second two dimensional array of optical ports, a respective second bulk optical element having optical power and having a fifth focal plane substantially coplanar with said second focal plane of said first plurality of lenses; wherein each wavelength channel of a WDM signal entering at port of said first array of optical ports is individually switchable to any of the port in first array of optical ports in a same row as the port where the WDM signal entered and any of the second array of optical ports through appropriate control of the array of switching elements.

In some embodiments, the switching elements are MEMS switching elements.

In some embodiments, each bulk optical element a lens or a curved mirror.

In some embodiments, the dispersive element is selected from a group comprising: a diffraction grating, either reflection and transmission type, prisms.

According to another broad aspect, the invention provides a wavelength cross connect comprising: a first plurality of lenses stacked vertically; a second plurality of lenses stacked vertically, spaced from said first plurality of lenses, non-overlapping in vertical space with said first plurality of lenses; a first plurality of dispersive elements, with one dispersive element substantially in a first focal plane of each of said first plurality of lenses; a second plurality of dispersive elements, with one dispersive element substantially in a second focal plane of each of said second plurality of lenses; a first array of micro-mirrors tiltable in two directions, the first array being substantially in a second focal plane of each of said first plurality of lenses; a second array of micro-mirrors tiltable in two directions, the second array being substantially in a first focal plane of each of said second plurality of lenses; a first two dimensional array of optical ports; a second two dimensional array of optical ports; a first bulk optical element having optical power and having a fourth focal plane substantially coplanar with said first focal plane of said second plurality of lenses; a second optical element having optical power and having a fifth focal plane substantially coplanar with said second focal plane of said first plurality of lenses; wherein each wavelength channel of a WDM signal entering at port of said first array of optical ports is individually switchable to any of the port in first array of optical ports in a same row as the port where the WDM signal entered and any of the second array of optical ports through appropriate control of the array of switching elements.

In some embodiments, the switching elements are MEMS switching elements.

In some embodiments, each bulk optical element a lens or a curved mirror.

In some embodiments, the dispersive element is selected from a group comprising: a diffraction grating, either reflection and transmission type, prisms.

According to another broad aspect, the invention provides an arrangement comprising: a first two dimensional array of optical ports; a first two dimensional array of waveguide dispersive elements on a plurality of waveguide substrates, with one waveguide dispersive element per optical port in said first two dimensional array of optical ports, the first two dimensional array of waveguide dispersive elements collectively having a first output plane; for each row of said first two dimensional array of optical ports, a respective first bulk optical element having optical power and having a first focal plane substantially coplanar with said first output plane, and having a second focal plane; an first array of switching elements substantially in the second focal plane, each switching element being adapted to switch in both a horizontal and vertical direction; a second two dimensional array of optical ports; a second two dimensional array of waveguide dispersive elements on a plurality of waveguide substrates, with one waveguide dispersive element per optical port in said second two dimensional array of optical ports, the second two dimensional array of waveguide dispersive elements collectively having a second output plane; for each row of said second two dimensional array of optical ports, a respective second bulk optical element having optical power and having a fifth focal and having a sixth focal plane substantially coplanar with the second output plane; a second array of switching elements substantially in the fifth focal plane, each switching element being adapted to switch in both a horizontal and vertical direction; wherein each wavelength channel of a WDM signal entering at one of said first array of optical ports is individually switchable to any of the optical ports of the first array in a same row as the port through which the signal entered and any of the optical ports of the second array through appropriate control of the array of switching elements.

In some embodiments, the switching elements are MEMS switching elements.

In some embodiments, each bulk optical element having optical power is a lens or a curved mirror.

In some embodiments, the dispersive elements comprise arrayed waveguide gratings or Echelle gratings.

According to another broad aspect, the invention provides an arrangement comprising: a first two dimensional array of optical ports; a first two dimensional array of waveguide dispersive elements on a plurality of waveguide substrates, with one waveguide dispersive element per optical port in said first two dimensional array of optical ports, the first two dimensional array of waveguide dispersive elements collectively having a first output plane; a first bulk optical element having optical power and having a first focal plane substantially coplanar with said first output plane, and having a second focal plane; an first array of switching elements substantially in the second focal plane, each switching element being adapted to switch in both a horizontal and vertical direction; a second two dimensional array of optical ports; a second two dimensional array of waveguide dispersive elements on a plurality of waveguide substrates, with one waveguide dispersive element per optical port in said second two dimensional array of optical ports, the second two dimensional array of waveguide dispersive elements collectively having a second output plane; a second bulk optical element having optical power and having a fifth focal plane and having a sixth focal plane substantially coplanar with the second output plane; a second array of switching elements substantially in the fifth focal plane, each switching element being adapted to switch in both a horizontal and vertical direction; wherein each wavelength channel of a WDM signal entering at one of said first array of optical ports is individually switchable to any of the optical ports of the first array in a same row as the port through which the signal entered and any of the optical ports of the second array through appropriate control of the array of switching elements.

In some embodiments, the switching elements are MEMS switching elements.

In some embodiments, each bulk optical element having optical power is a lens or a curved mirror.

In some embodiments, the dispersive elements comprise arrayed waveguide gratings or Echelle gratings.

According to another broad aspect, the invention provides a wavelength cross connect comprising: a first plurality of lenses stacked vertically; a second plurality of lenses stacked vertically, spaced from said first plurality of lenses, non-overlapping in vertical space with said first plurality of lenses; a first plurality of dispersive elements, with one dispersive element substantially in a first focal plane of each of said first plurality of lenses; a second plurality of dispersive elements, with one dispersive element substantially in a second focal plane of each of said second plurality of lenses; a first array of transmissive switching elements controllable tiltable in two directions, the first array being substantially in a second focal plane of each of said first plurality of lenses; a second array of transmissive switching elements controllable in two directions, the second array being substantially in a first focal plane of each of said second plurality of lenses; a first two dimensional array of optical ports; a second two dimensional array of optical ports; for each row of said first two dimensional array of optical ports, a respective first bulk optical element having optical power and having a fourth focal plane substantially coplanar with said first focal plane of said second plurality of lenses; for each row of said second two dimensional array of optical ports, a respective second bulk optical element having optical power and having a fifth focal plane substantially coplanar with said second focal plane of said first plurality of lenses; wherein each wavelength channel of a WDM signal entering at port of said first array of optical ports is individually switchable to any of the port in first array of optical ports in a same row as the port where the WDM signal entered and any of the second array of optical ports through appropriate control of the array of switching elements.

In some embodiments, each bulk optical element a lens or a curved mirror.

In some embodiments, the dispersive element is selected from a group comprising: a diffraction grating, either reflection and transmission type, prisms.

According to another broad aspect, the invention provides a wavelength cross connect comprising: a first plurality of lenses stacked vertically; a second plurality of lenses stacked vertically, spaced from said first plurality of lenses, non-overlapping in vertical space with said first plurality of lenses; a first plurality of dispersive elements, with one dispersive element substantially in a first focal plane of each of said first plurality of lenses; a second plurality of dispersive elements, with one dispersive element substantially in a second focal plane of each of said second plurality of lenses; a first array of transmissive switching elements controllable tiltable in two directions, the first array being substantially in a second focal plane of each of said first plurality of lenses; a second array of transmissive switching elements controllable in two directions, the second array being substantially in a first focal plane of each of said second plurality of lenses; a first two dimensional array of optical ports; a second two dimensional array of optical ports; a first bulk optical element having optical power and having a fourth focal plane substantially coplanar with said first focal plane of said second plurality of lenses; a second optical element having optical power and having a fifth focal plane substantially coplanar with said second focal plane of said first plurality of lenses; wherein each wavelength channel of a WDM signal entering at port of said first array of optical ports is individually switchable to any of the port in first array of optical ports in a same row as the port where the WDM signal entered and any of the second array of optical ports through appropriate control of the array of switching elements.

In some embodiments, each bulk optical element a lens or a curved mirror.

In some embodiments, the dispersive element is selected from a group comprising: a diffraction grating, either reflection and transmission type, prisms.

According to another broad aspect, the invention provides an arrangement comprising: a first plurality of lenses stacked vertically; a second plurality of lenses stacked vertically, spaced from said first plurality of lenses, non-overlapping in vertical space with said first plurality of lenses; a first plurality of dispersive elements, with one dispersive element substantially in a first focal plane of each of said first plurality of lenses; a second plurality of dispersive elements, with one dispersive element substantially in a second focal plane of each of said second plurality of lenses; a first array of micro-mirrors tiltable in two directions, the first array being substantially in a second focal plane of each of said first plurality of lenses; a second array of micro-mirrors tiltable in two directions, the second array being substantially in a first focal plane of each of said second plurality of lenses; a first plurality of two dimensional arrays of optical ports; a second plurality of two dimensional arrays of optical ports; for each two dimensional array of said first plurality of two dimensional arrays of optical ports, a respective first bulk optical element having optical power and having a fourth focal plane substantially coplanar with said first focal plane of said second plurality of lenses; for each two dimensional array of said second plurality of two dimensional arrays of optical ports, a respective second bulk optical element having optical power and having a fifth focal plane substantially coplanar with said second focal plane of said first plurality of lenses; wherein each wavelength channel of a WDM signal entering at one of said first plurality of arrays of optical ports is individually switchable to any of the first plurality of arrays of optical ports and any of the second plurality of arrays of optical ports through appropriate control of the array of switching elements.

In some embodiments, the switching elements are MEMS switching elements.

In some embodiments, the switching elements are transmissive.

In some embodiments, each bulk optical element is selected from a group consisting of a lens, a curved mirror, an assembly of lenses and mirrors, and an assembly of lenses, mirrors and a curved mirror.

In some embodiments, the second bulk optical element is selected from a group consisting of a lens, a curved mirror, an assembly of lenses and mirrors, and an assembly of lenses, mirrors and a curved mirror.

In some embodiments, the dispersive element is selected from a group comprising: a diffraction grating, either reflection and transmission type, prisms.

DETAILED DESCRIPTION OF THE PREFERRED EMBODIMENTS

The following detailed descriptions of FIGS. 1 to 11 are used to explain the mode of operation of the invention and describe the preferred embodiments are per the invention, but should not be understood in narrow terms. Some of the elements shown can be replaced by other realizations performing similar tasks. For example, wavelength dispersion can be realized through diffraction gratings (both reflection and transmission type) or prisms in free-space embodiments or through arrayed waveguide gratings or Echelle gratings in waveguide embodiments. Bulk optical elements having optical powers can be any of a lens, a curved mirror, or any suitable combination of optical elements, either spherical or cylindrical, that provide the appropriate optical function. The array of switching means can be either reflective (mirrors, tunable gratings, interferometric arrangements of fixed and movable membranes, etc.), with the best mode being micro-mirror arrays fabricated through micro-fabrication processes, or transmissive (liquid crystal, electro-holograms, optical phase arrays, tiltable micro-prisms or movable micro-lenses, etc.). An example of a liquid crystal based switch is shown in: Patel et al., Photonics Technology Letters, Vol. 7, No. 5, May 1995. Waveguide and free space embodiments are possible to perform each of the dispersion and optical coupling steps, and any arbitrary appropriate combination can be employed. Although most of the descriptions will explain how to use arrangements as per the invention as a ROADM with multiple drop ports or ROADM/WXC with multiple drop ports, more generalization is possible without departing from the spirit of the invention. For example, since light paths are bidirectional, drop ports can also be used as add ports or inputs for outputs.

Furthermore, input or add and output or drop ports being essentially equivalent, their choice is arbitrary and should not limit the scope of the invention. Consistent choices will be made throughout the following for ease of description: unless otherwise specified, the middle port in a group of ports is used as input/output, while the remaining ports in the group are used as add/drop ports. However, this is completely arbitrary.

In the following description of all figures except 3D perspective views (FIGS. 3 and 7), the top part of each figure shows a top view, also referred to as the dispersion plane due to the choice of orientation of the dispersive elements, while the bottom part of the figure shows the side view.

Figure 1:
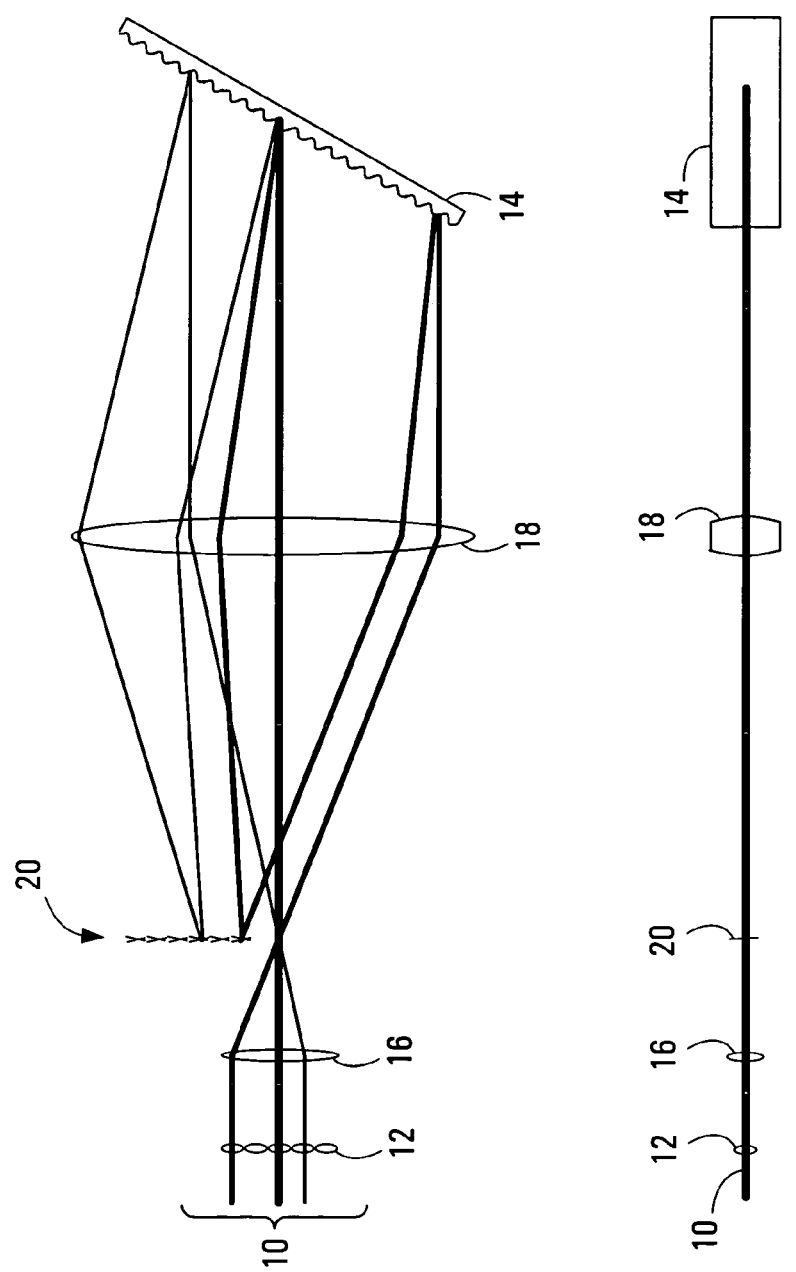
FIG. 1 shows top and side views of a conventional wavelength switch configured as a 1×5 wavelength selective switch using free-space optics and MEMS switching elements.

FIG. 1 shows a known wavelength switch taught in D. M. Marom et al., Optical Fibre Communications conference, PD FB7, Anaheim, 2002. It is configured as a 1×5 with MEMS switching elements.

A group of 5 optical ports 10 is provided in the form of a linear array of optical fibres coupled to an array of micro-lenses 12 used to substantially collimate/focus the light beams from/to the optical fibres. In the cited reference, the middle fibre is used as an input port, while the 4 others are used as outputs, although light paths going from the middle fibre back to the middle fibre are possible when used in conjunction with an optical circulator (thus the denomination as a 1×5 arrangement).

In operation, a light beam containing multiple wavelengths is input through the middle optical port, is collimated by the middle micro-lens and is directed to a diffraction grating 14 through a telescope arrangement consisting of a coupling lens 16 and a main lens 18. After reflecting from the diffraction grating 14, the light beam is demultiplexed into a plurality of wavelength channels, each impinging on a corresponding MEMS switch element 20. This MEMS can tilt in the plane of the dispersion to route the wavelength channels to alternate locations on the diffraction grating 14. The images of these alternate locations through the telescope can be made to precisely align to one of the micro-lens, thus the wavelength channels is made to couple to a selectable optical port.

As is known to a person skilled in the art, off-axis aberrations in any optical system worsen dramatically as the field of view is increased. This is all the more true when the optical system is already working off-axis, which is the case in the dispersion plane because of the physical extent of the MEMS array 20. In the cited reference, increasing the number of optical ports would mean a bigger image for the telescope, and thus a bigger field of view for the main lens in particular. Therefore, the wavelength switch as per the prior art is limited to a small number of optical ports. Typically, no more than 8 ports can be arranged in such an optical system without generating excessive penalty in either optical performance (mainly insertion loss uniformity over wavelength) or size.

Figure 2:
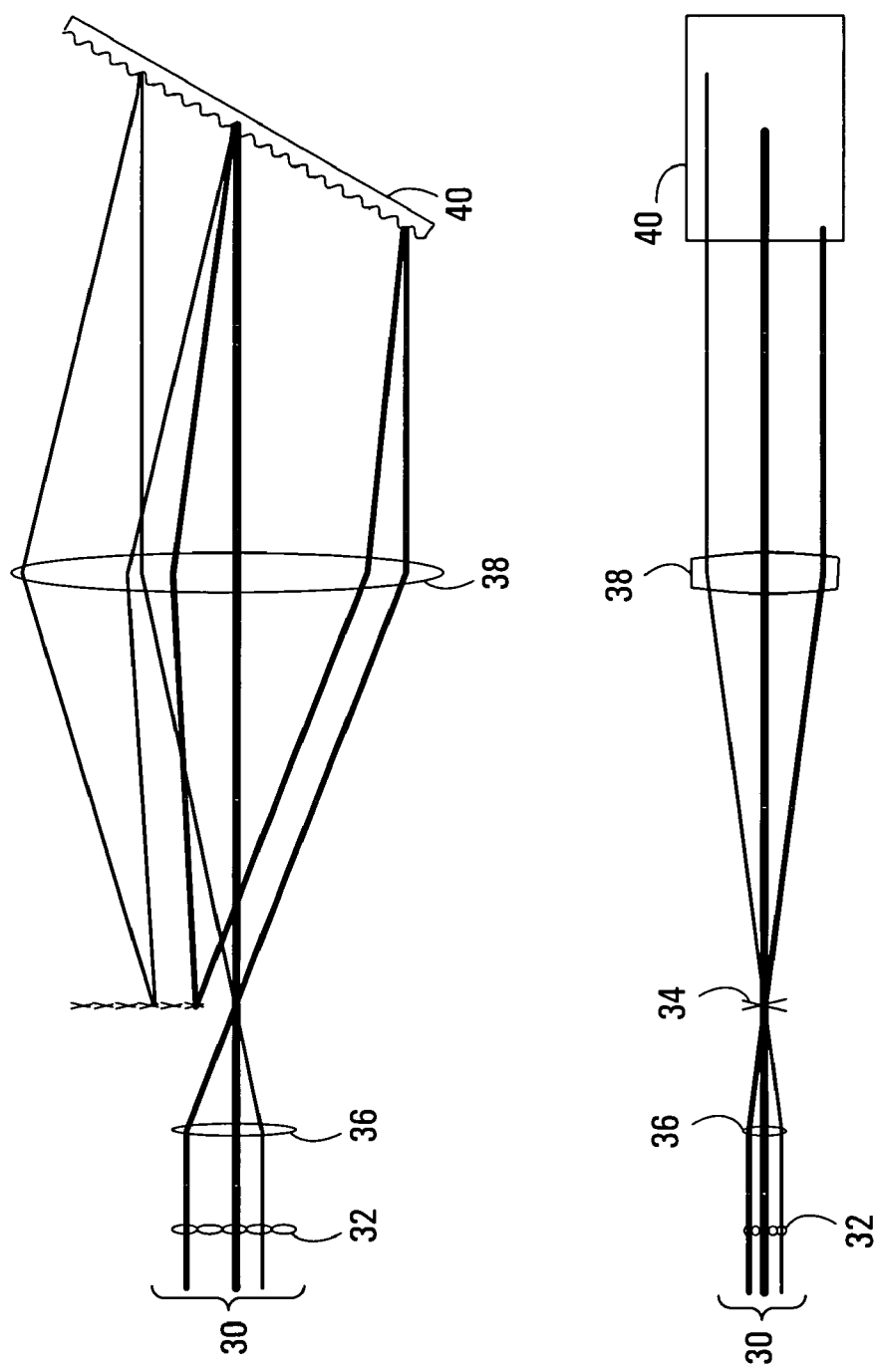
FIG. 2 shows top and side views of a ROADM with large number of add/drop ports configured as a 1×25 wavelength selective switch using free-space optics and MEMS switching elements.

FIG. 2 shows a wavelength switch providing a large number of optical ports that can be used for example as a ROADM with a large number of add/drop ports. In the example shown on FIG. 2, the wavelength switch can be configured as a 1×25. This is a variant of a system taught in U.S. Pat. No. 6,549,699 to Belser et al.

This dramatic increase in scalability in number of ports is achieved by using a two dimensional arrangement of optical ports consisting of a two dimensional array of fibres 30 connected to a two dimensional array of micro-lenses 32 to substantially collimate/focus light beams as they emerged/ are coupled to the optical fibres and by using an array of MEMS switching elements 34 capable of directing light beams in both the plane of dispersion and the plane perpendicular to the plane of dispersion. In the example shown in FIG. 2, the ports are arranged in a 5×5 array, enabling one input and 25 potential outputs, thus the 1×25 naming (counting the path from the input back to itself as one possible path, although requiring an external circulator).

In operation, a light beam containing multiple wavelengths is input through the middle optical port, is collimated by the middle micro-lens and is directed to the diffraction through a telescope arrangement consisting of a coupling lens 36 and a main lens 38. After reflecting from a diffraction grating, the light beam is demultiplexed into a plurality of wavelength channels, each impinging on a corresponding MEMS switch element 34. This MEMS can tilt both in the plane of the dispersion and in the plane perpendicular to the dispersion plane to route the wavelength channels to alternate locations on the diffraction grating 40. The images of these alternate locations through the telescope can be made to precisely align to one of the micro-lens of the two dimensional array 32, thus each wavelength channel is made to couple to a selectable optical port.

Throughout this description, a wavelength channel is an arbitrary contiguous frequency band. A single wavelength channel might include one or more ITU wavelengths and intervening wavelengths for example. Even though the expression "λ" is referred to herein in respect of a wavelength channel, this is not intended to imply a wavelength channel is a single wavelength only.

By using a two dimensional arrangements of optical ports, the image formed on the grating 40 containing all possible alternate locations is small both in the dispersion plane and in the plane perpendicular to the dispersion plane. Compared to a prior art implementation as described in FIG. 1 expanded to include the same number of ports, the width of the image in the plane of dispersion would be reduced by a factor of 6, which has a dramatic impact on optical performances of the system. The larger size of the embodiment as per the invention in the plane perpendicular to the dispersion plane has a small negative impact since the system remains mostly on-axis in that plane.

Therefore, assuming that 8 ports was the practical limitations imposed by optical design on an implementation as per the prior art, the two dimensional arrangement of optical ports provided by the invention would enable building a device of up to 1×64 ports or with a smaller number of ports but with improved optical performances and smaller size. These numerical values are for the purpose of explaining the improvement over the FIG. 1 arrangement. Other numbers of ports are possible.

Figure 3:
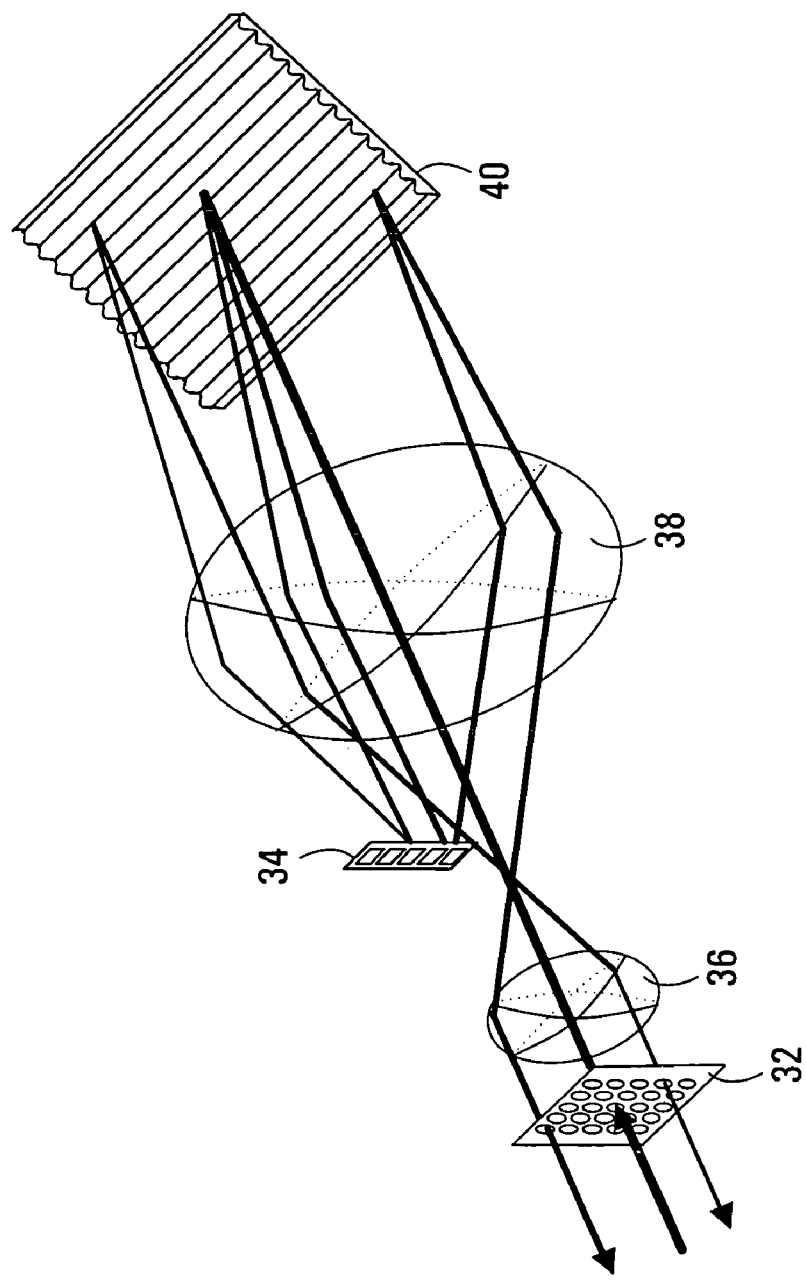
FIG. 3 shows a perspective view of the ROADM of FIG. 2.

FIG. 3 shows a perspective view. The two dimensional arrangement of ports and corresponding micro-lenses is clearly visible on this drawing.

Figure 4:
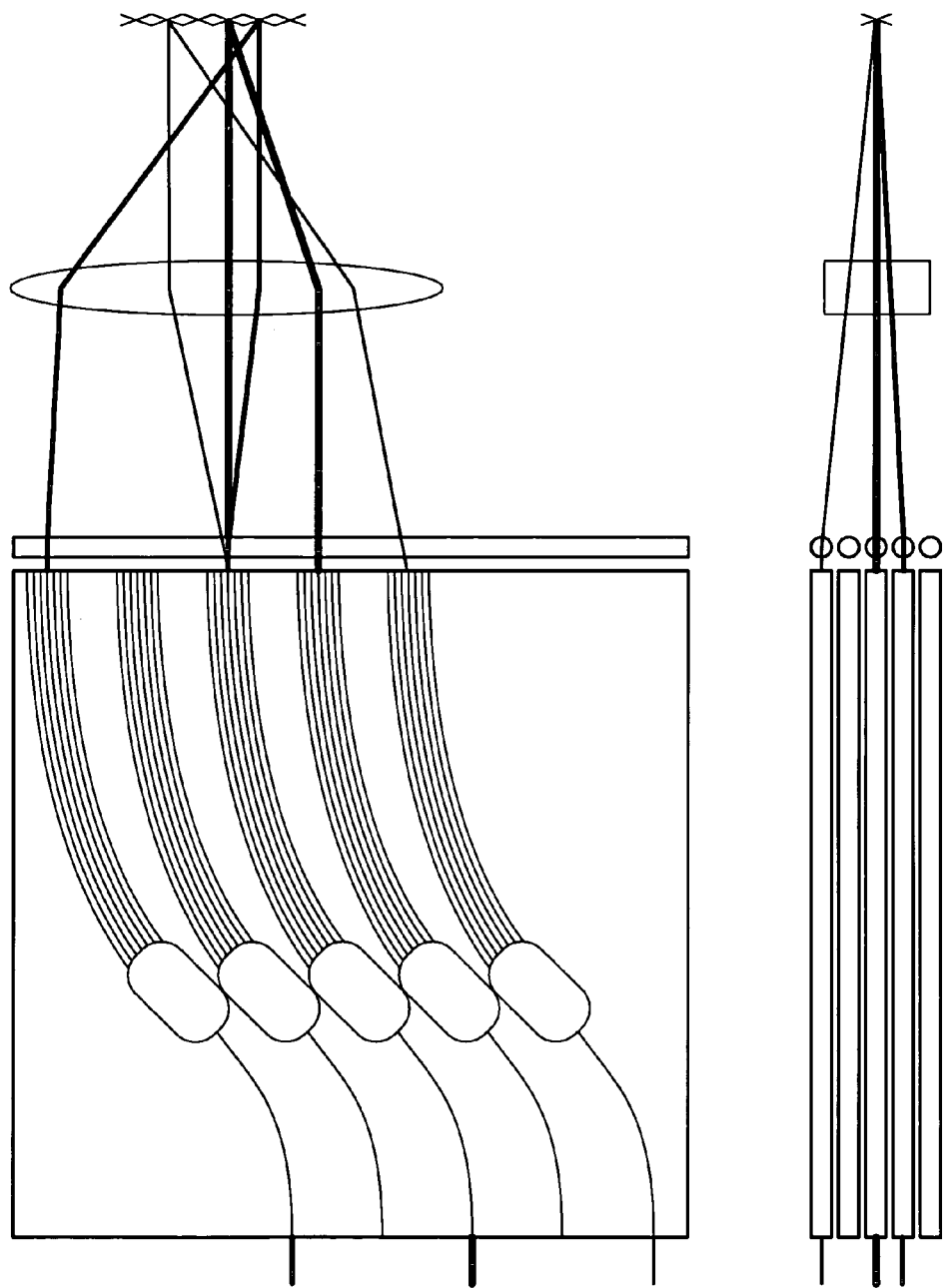
FIG. 4 shows top and side views of a ROADM provided with a large number of add/drop ports configured as a 1×25 wavelength selective switch using waveguide optics and MEMS switching elements.

FIG. 4 shows another embodiment, as per U.S. patent application Ser. No. 10/493,107 filed May 20, 2003 and published as U.S. Pat. Publication No. 2004/0252,938 on Dec. 16, 2004, performing a similar function than that of the device shown in FIG. 3, but using waveguide based dispersive elements.

The waveguide based dispersive elements and the associated coupling optics necessary to use them are described in applicants co-pending U.S. patent application Ser. No. 10/493,107 filed May 20, 2003 and published as U.S. Pat. Publication No. 2004/0252,938 on Dec. 16, 2004, which is hereby incorporated by reference in its entirety.

Figure 5:
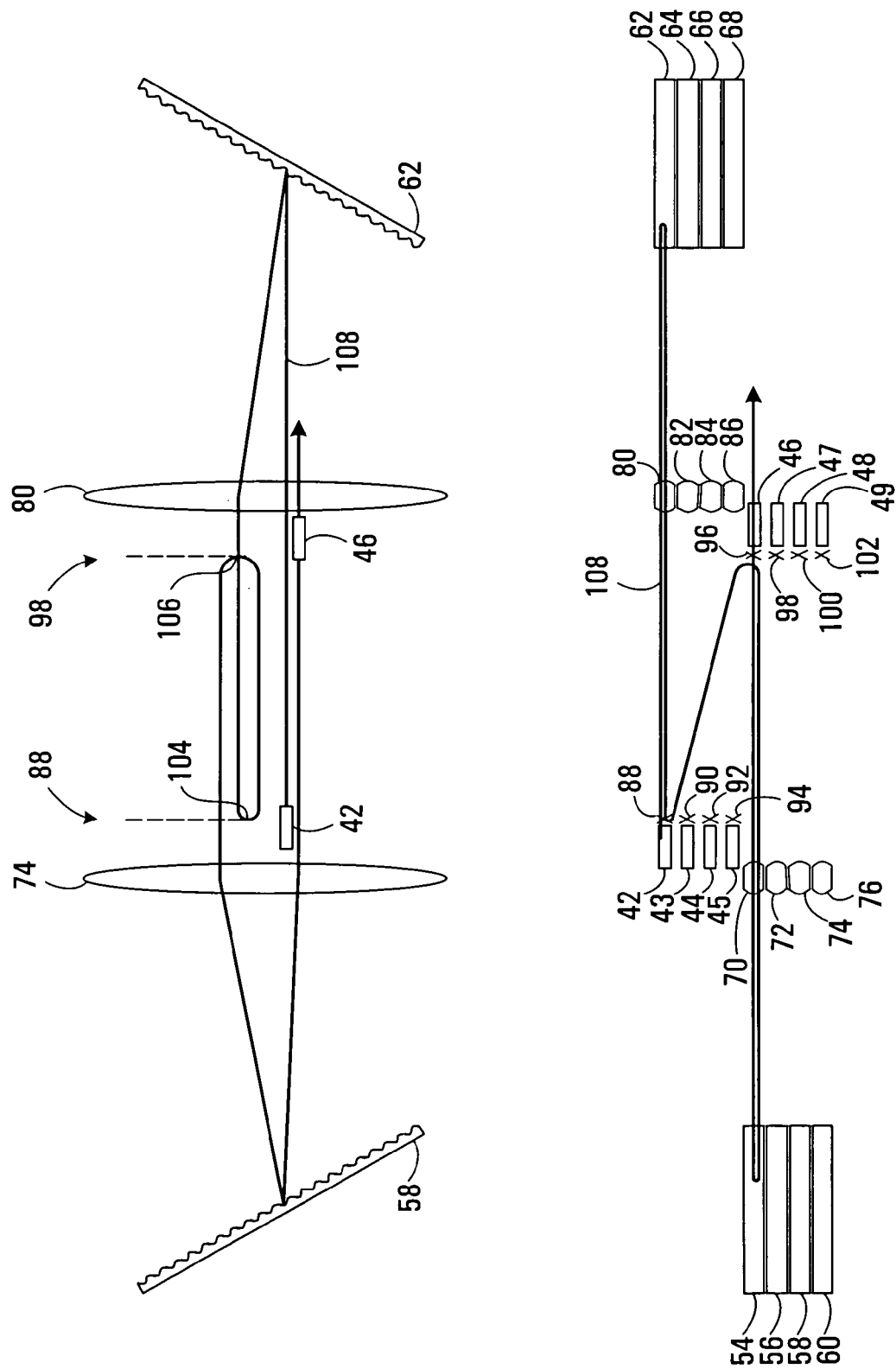
FIG. 5 shows a wavelength cross-connect arrangement using free-space optics and MEMS switching elements, provided by an embodiment of the invention.

FIG. 5 shows a wavelength cross-connect arrangement using free-space optics and MEMS switching elements provided by an embodiment of the invention. It basically consists of a first stack 54, 56, 58, 60 and a second stack 62, 64, 66, 68 of dispersive arrangements connected together via optical paths established by MEMS micro-mirrors capable of tilting in the plane perpendicular to the dispersion plane. More specifically, referring to the bottom view of FIG. 5, there are four input ports 42, 43, 44, 45 and four output ports 46, 47, 48, 49. This designation between input and output is arbitrary, and any port can function as either input or output. Each input port 42, 43, 44, 45 has a respective main lens 80, 82, 84, 86 through which light travels on the way to a respective diffraction grating 62, 64, 66, 68. Each diffraction grating 62, 64, 66, 68 redirects light back through the respective main lens 80, 82, 84, 86 to a respective array of MEMS micro-mirrors 88, 90, 92, 94. Each array of MEMS micro-mirrors, for example array 88 shown in the top view, includes a series of micro-mirrors arranged in a line perpendicular to the view in the bottom of FIG. 5. Also shown is a second set of micro-mirror arrays 96, 98, 100, 102 each of which directs light through a respective main lens 70, 72, 74, 76 to a respective diffraction grating 54, 56, 58, 60. The diffraction gratings 54, 56, 58, 60 redirect light back through the main lens 70, 72, 74, 76 and through output ports 46, 47, 48, 49. The top view of FIG. 5 shows functionality for input port 42 and output port 46. Each port might include associated beam forming optics if necessary, this being illustrated by the rectangles in the figure. This might for example consist of being expanders/reducers, either spherical or anamorphic.

The arrangement of FIG. 5 allows any wavelength or combination of wavelengths received on any input port to be routed to any of the output ports. It is noted that in this embodiment, the micro-mirrors in arrays 88, 90, 92, 94 only tilt in one plane. And as such light is always reflected from one micro-mirror of one of the first arrays 88, 90, 92, 94 to a corresponding micro-mirror in one of the second arrays 96, 98, 100, 102. An example of this is shown in the top view of FIG. 5 where input port functionality is shown in respect of the first input port 42, and output port functionality is shown in respect of the first output port 46. The route travelled by a single wavelength is indicated generally at 108. A signal comes in through input port 42, and this passes through the first port's main lens 80 to the first port's diffraction grating 62. This performs a wavelength dependent redirection back through the main lens 80 to one of the micro-mirrors of the first input port's micro-mirror array 88. Specifically, light is directed onto micro-mirror 104 forming part of micro-mirror array 88. In the illustrated example, it is assumed that this is the first micro-mirror of array 88. This is reflected to a corresponding micro-mirror in micro-mirror array 96, and in particular the first micro-mirror 106. Micro-mirror 106 reflects the light through the first output port's main lens 70 to the first output port's diffraction grating 54 which performs a wavelength dependent redirection back through main lens 70 and through the output port 46.

In the example shown in FIG. 5, each stack contains four dispersive arrangements. One dispersive arrangement of each stack is shown in the top view. The four dispersive arrangements are aligned on top of each other as indicated in the figure. The two stacks are positioned one on the left and one on the right hand side such that the MEMS mirrors from the first stack can establish an optical path to the MEMS mirrors in the second stack and vice-versa in at least the plane perpendicular to the dispersion plane.

In operation, four light beams containing a plurality of wavelength channels are input to the WXC on the four input ports 42, 44, 46, 48 (arbitrarily chosen as the left hand side top fibre stack in the figure). The four light beams travel through their respective main lens 80, 82, 84, 86 to their respective diffraction grating 62, 64, 66, 68 where they get demultiplexed into a respective plurality of wavelength channels. Each respective plurality of wavelength channels is routed to a corresponding first MEMS micro-mirror (one micro-mirror per input port and per wavelength channel) in the respective array 88, 90, 92, 94 through their respective main lens 80, 82, 84, 86. These MEMS micro-mirrors can establish an optical path to second MEMS micro-mirrors in arrays 96, 98, 100, 102 of the second stack of dispersive arrangements. Each micro-mirror of the arrays 96, 98, 100, 102 is then tilted such that each wavelength channel from each light beam is routed through their corresponding second main lens 70, 72, 76, 78 to their corresponding second diffraction grating 54, 56, 58, 60 where they get remultiplexed into four respective light beams. These four respective light beams are routed to the output optical ports 46, 47, 48, 49 through their respective second main lens 70, 72, 74, 76.

Another embodiment as per the invention but not shown uses transmissive switching means instead of MEMS micromirror arrays 88, 90, 92, 94, 96, 98, 100, 102. The embodiment would look like the below described FIG. 11 embodiment, but with only one part in the top view of FIG. 11, and multiple parts in the bottom view.

In another embodiment, the embodiment of FIG. 5 is implemented using waveguide disperssive elements. The embodiment would look like the embodiment of FIG. 8 described below, but with only a single part on each side in the top view, and multiple parts in the bottom view.

Figure 6A:
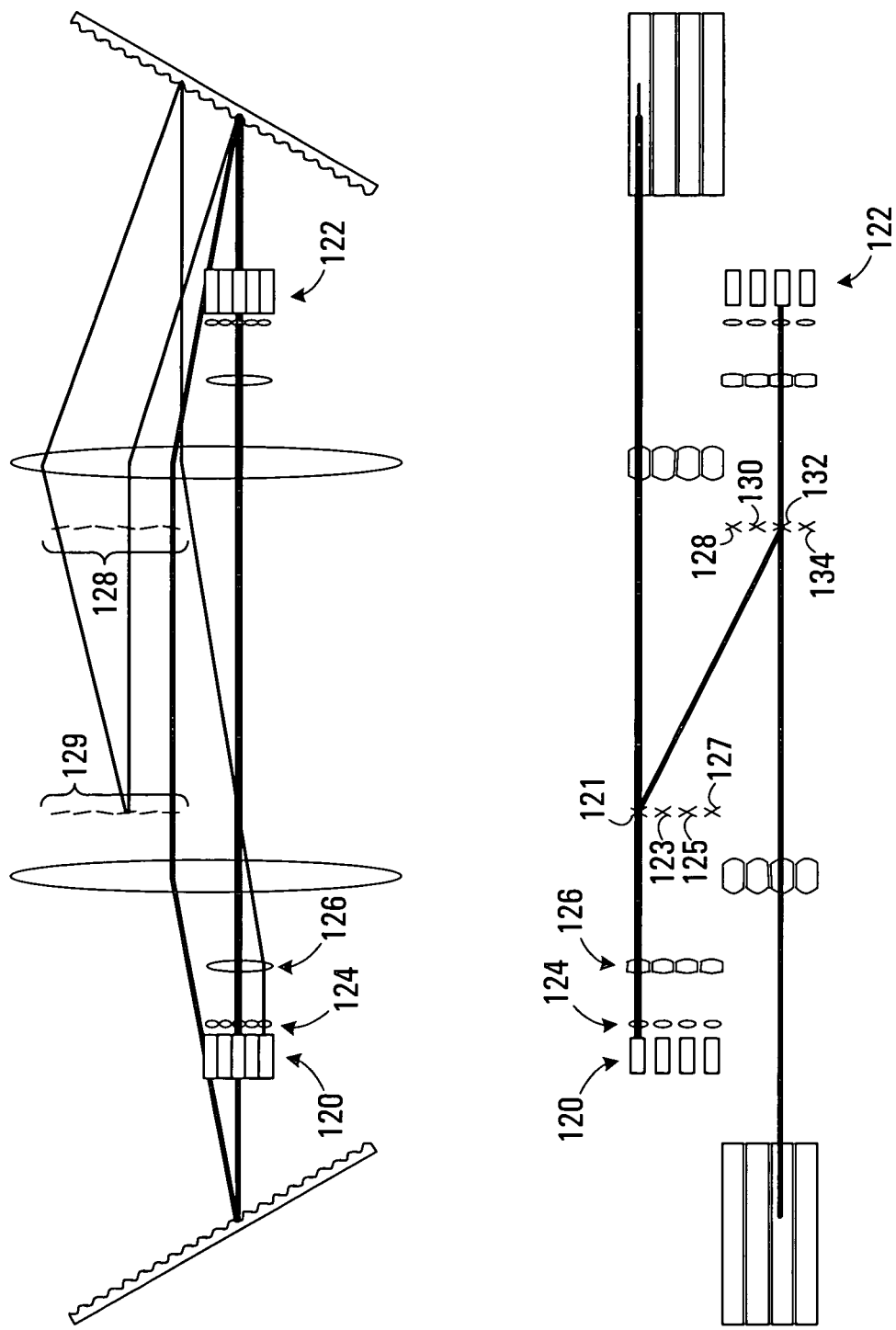
FIG. 6A shows top and side views of a WXC/ROADM device provided by an embodiment of the invention using free-space optics and MEMS switching elements, in which each optical port has 5 local add/drop ports.

FIG. 6A shows an integrated WXC/ROADM device provided by an embodiment of the invention using free-space optics and MEMS switching elements, in which each ROADM has 5 local add/drop ports. This embodiment is similar to that of FIG. 5, but in this embodiment, to provide this added functionality, the optical ports are now grouped in a first two dimensional array of ports 120 and a second two dimensional array of ports 122. More specifically, the input array of ports in the illustrated example consists of an array of four rows of five ports. The 4×5 array of input ports 120 has an associated micro-lens 124 for each input port, and each column of ports has a respective collimating lens 126. Similar coupling optics are provided at the output port 122. The one dimensional tilting micro-mirror arrays 88, 90, 92, 94, 96, 98, 100, 102 of FIG. 5 are replaced with arrays 121, 123, 125, 127, 128, 130, 132, 134 of micro-mirrors which are capable of tilting both in the plane of dispersion and in the perpendicular plane to the dispersion plane. For ease of description of this figure, row refers to the dispersion plane, while column refers to the plane perpendicular to the dispersion plane.

In the plane perpendicular to the dispersion plane, the integrated WXC/ROADM looks similar to a simple WXC (like FIG. 5), with the exception of a slightly more complex coupling optics. In the dispersion plane, however, there are multiple optical ports provided per dispersive arrangement compared to only one in the embodiment of FIG. 5. These added ports can be used for example as local add/drop ports, although other uses are possible without departing from the spirit of the invention. Arbitrarily, the middle optical ports of each row of ports are chosen as an input/output ports, while the other ports are chosen as add/drop ports.

In operation, four light beams containing a plurality of wavelength channels are input to the WXC on the four input ports of the input group (arbitrarily chosen as the left hand side top fibre stack in the side view figure, middle column of the two dimensional array of optical ports). The four light beams are collimated by their respective micro-lenses corresponding to the middle column of the two dimensional micro-lens array and input to their respective dispersive arrangement. The four light beams travel through their respective main lens to their respective diffraction grating where they get demultiplexed into a respective plurality of wavelength channels. Each respective plurality of wavelength channels is routed to a corresponding first MEMS micro-mirror (one micro-mirror per input port and per wavelength channel) through their respective main lens. These MEMS micro-mirrors can establish an optical path to second MEMS micro-mirrors of the second stack of dispersive arrangements or send the light back towards their respective first dispersive arrangement.

For the beams being routed to these second MEMS elements, these second MEMS micro-mirrors are tilted such that each wavelength channel from each light beam is routed through their corresponding second main lens to their corresponding second diffraction grating where they get remultiplexed into four respective light beams. These four respective light beams are routed to the output optical ports through their respective second main lens.

For the beams being routed back towards their respective first dispersive arrangement, their corresponding first MEMS micro-mirror can be tilted in the dispersion plane to route the corresponding wavelength channel to alternate locations on their respective diffraction grating. As explained in the description of FIG. 1, this alternate location is imaged to an alternate location in their respective micro-lens array row, corresponding to a tuneable add/drop port.

Therefore, a function of simultaneously WXC (for the beams bouncing off first MEMS and second MEMS) and add/drop (for the beams bouncing off only first MEMS) is provided in a single device.

Figure 6B:
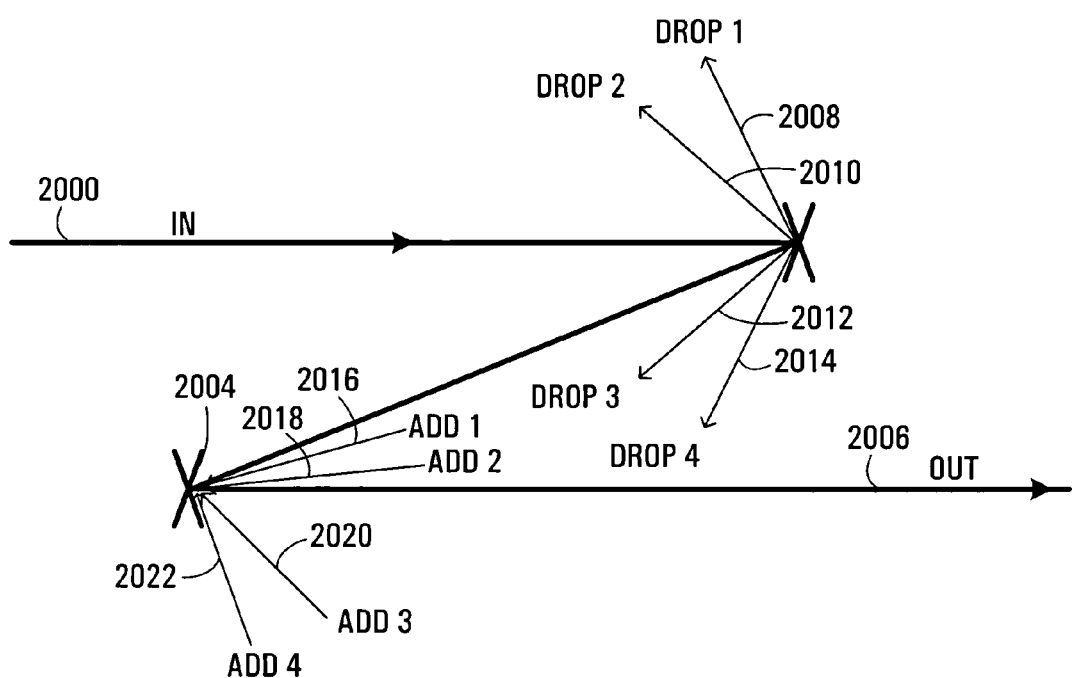
FIG. 6B shows the add/drop/switch function of the device of FIG. 6A.

FIG. 6B is a diagram showing the add/drop/switch functionality of the embodiment of FIG. 6A. For the embodiment of 6B, port 2000 is an arbitrary port from the left hand array of ports 120, and port 2006 is an arbitrary port from the right hand array of ports 122. Light is shown entering the port 2000. A wavelength channel dependent switching function is realized as indicated generally at 2002. Through appropriate selection of the angle of the switching elements, any wavelength channel can be returned to a port in the same row as input port 2000. Drop ports 2008, 2010, 2012, 2014 are shown, functioning as the drop ports in the same row as input port 2000. Any wavelength channel in the input signal can be routed back to any of these drop ports. Similarly, any wavelength channel can be routed to a second switching element generally indicated at 2004. Note the first switching element 2002 belongs to array 129 while the second switching element 2004 belongs to array 128. A similar functionality is achieved at the output port 2006. Namely, any other port in the same row as the output port 2006 can function as an add port. Ports 2016, 2018, 2020, 2022 are shown in the figure functioning as add ports. A wavelength channel can be input to any of these add ports and will be added to the output signal at port 2006. Thus, with one bounce off the switching element, local drops at the input can be achieved and local drops at the output can be achieved with two bounces off the two sets of switching elements, a switching function from an input port to any of the output ports is achieved.

In another embodiment the tilt in the dispersion plane is provided with the second MEMS, not the first one, yielding different possible application.

In yet another embodiment as per the invention, the tilt is provided by either the first MEMS or the second MEMS depending on wavelength channels.

Figure 7:
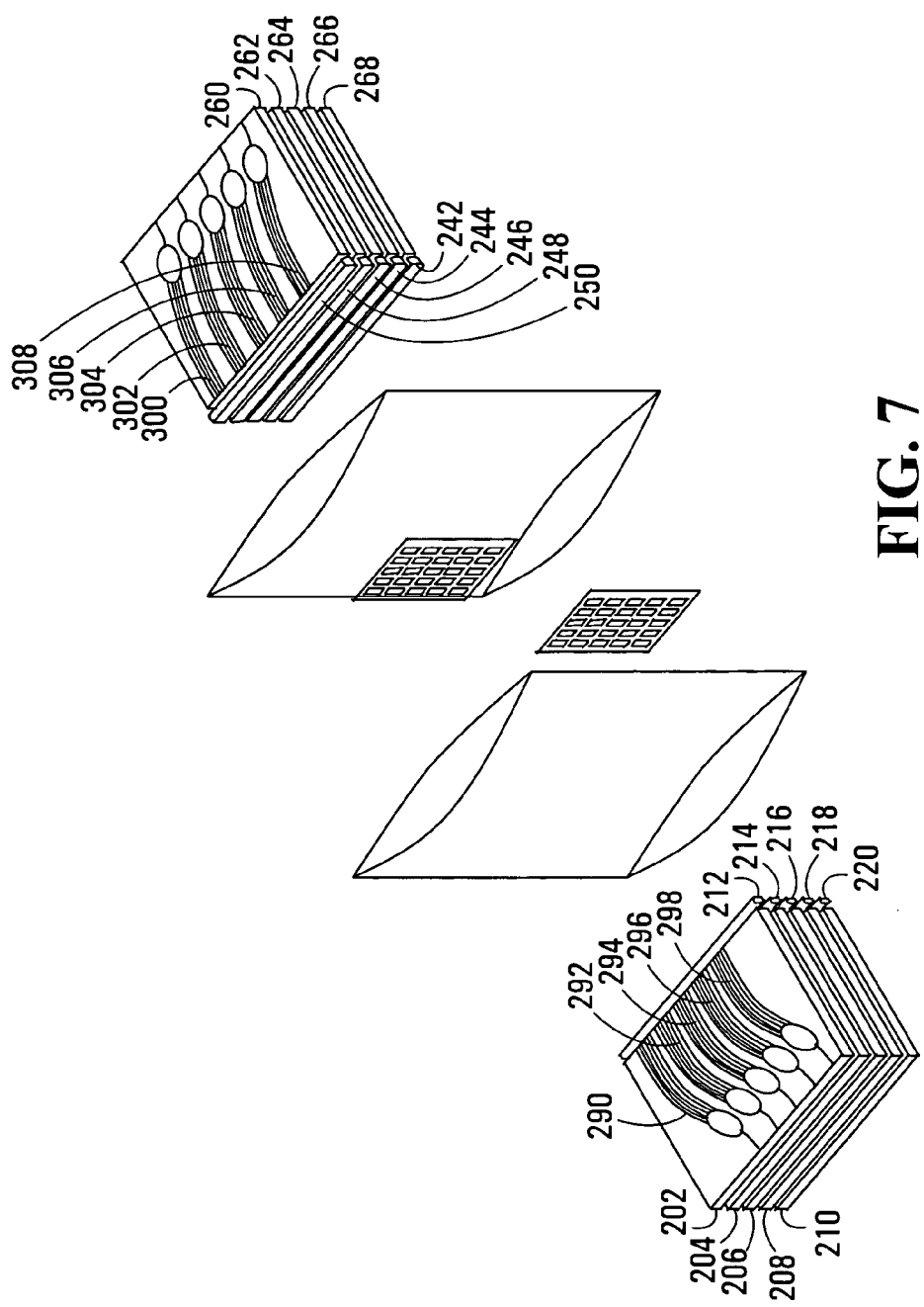
FIG. 7 shows a perspective view of the elements of the embodiment shown in FIG. 8.
Figure 8:
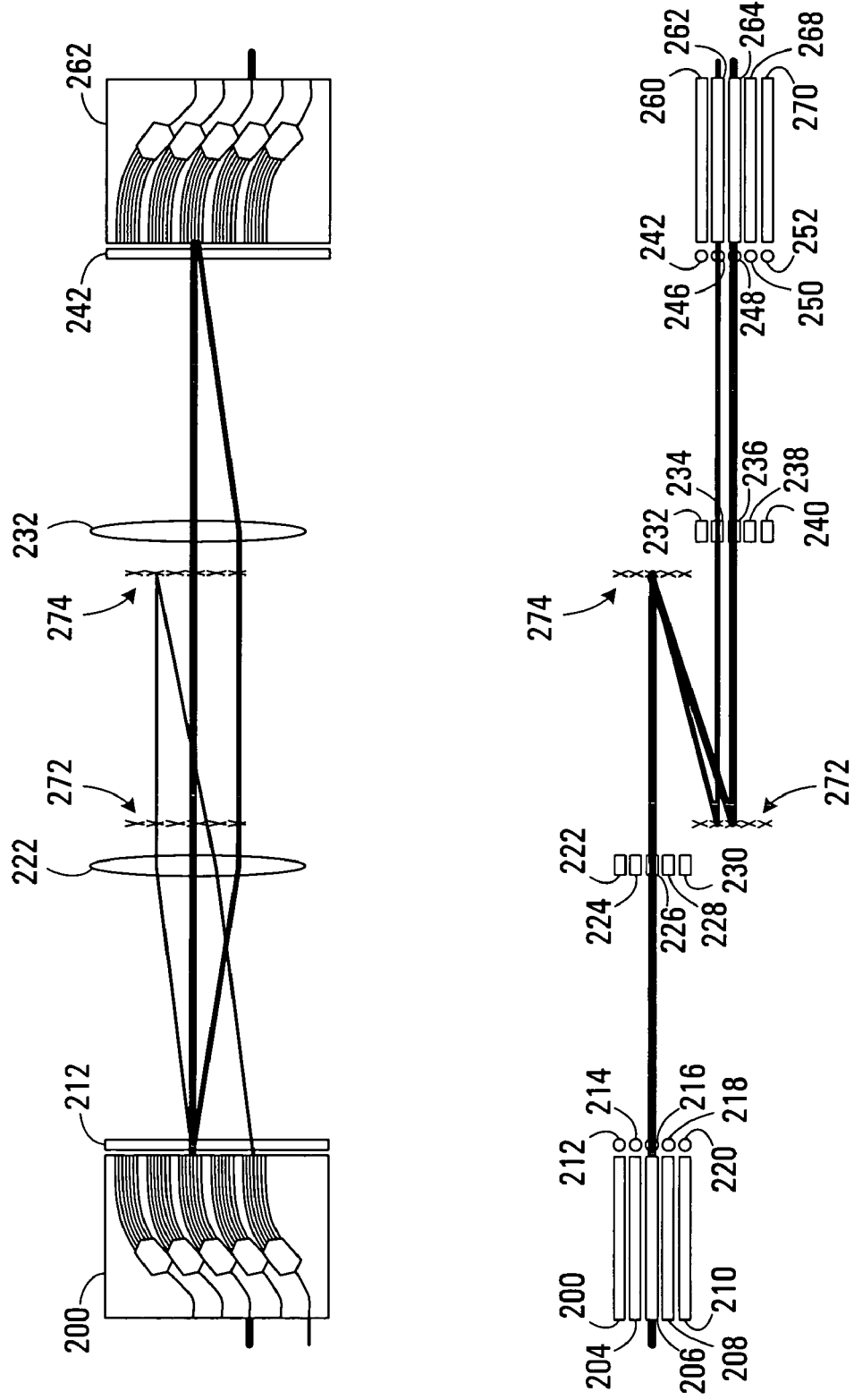
FIG. 8 shows top and side views of a WXC/ROADM device provided by an embodiment of the invention using waveguide optics and MEMS switching elements, in which each optical port has 5 local add/drop ports.

FIG. 7 shows a perspective view of the elements of the embodiment described in FIG. 8 of an integrated WXC/ROADM using waveguide and MEMS configured as a 5×5 WXC wherein each optical port can have 5 local add/drop paths (again counting the case of the light being directed from the input back to itself as a possible local add/drop path with the use of an external circulator).

FIG. 8 shows a preferred embodiment as per the invention in which waveguide dispersive elements are used in conjunction with MEMS based arrays of switching means to realize an integrated ROADM/WXC device with 5×5 wavelength cross-connect capacity and 1×5 local add/drop capability on each of the 5 incoming and 5 out coming ports.

This arrangement consists of a first two dimensional array of waveguide based dispersive elements. These are realized through a stack of single dimensional arrays 200, 204, 206, 208, 210 each of which contains five waveguide dispersive elements. The waveguide dispersive elements 290, 292, 294, 296, 298 of array 200 are shown in the perspective view of FIG. 7. Each array 200, 204, 206, 208, 210 has a respective cylindrical lens 212, 214, 216, 218, 220 to collimate/focus light beams emitted/received by the waveguide dispersive elements in the plane perpendicular to the waveguide substrate. Each waveguide device of the stack is further coupled to respective main cylindrical lens 222, 224, 226, 228, 230. The main cylindrical lens is used to focus/collimate light beams emitted/received by the waveguide dispersive element in the waveguide substrate's plane. The arrangement further comprises a first stack of switching elements 274 which is a two dimensional array of MEMS micro-mirrors capable of tilting in two dimensions. Although MEMS micro-mirrors are depicted in the figure, alternative switching elements can also be used as mentioned previously. There is a second two dimensional array of micro-mirrors 272 which redirects light received from the first two dimensional array of micro-mirrors 274 through a second set of main cylindrical lenses 232, 234, 236, 238, 240. There is a second stack of arrays of waveguide dispersive elements 260, 262, 264, 268, 270 with respective collimating lenses 242, 246, 248, 250, 252 aligned with cylindrical lenses 232, 234, 236, 238, 240.

The different elements are arranged such that if a light beam containing a plurality of wavelength channels is input into one of the optical ports of the first stack of waveguide devices, it is dispersed by its respective waveguide dispersive elements into a plurality of light beams each containing a wavelength channel. These light beams are routed through the respective cylindrical lens and main cylindrical lens to a corresponding switching element (there is one switching element per wavelength channel per waveguide device in a stack). These switching elements can either send the light back towards their incoming waveguide device in the first stack, providing local add/drop ports or send the light towards a corresponding second switching element of the second stack of array of switching elements. These second switching elements can route the beams towards any of the optical ports of the corresponding waveguide device in the second stack.

Although in the figure there is provided a first array of main cylindrical lenses and a second array of main cylindrical lenses, it is apparent to a man skilled in the art that each of the lenses of the first and second array can be replaced by a single first and single second bigger main cylindrical lenses. The embodiment featuring the bigger main cylindrical lenses is shown in the perspective view of FIG. 7 whereas the embodiment showing arrays of main cylindrical lenses is shown in the views of FIG. 8.

Figure 9:
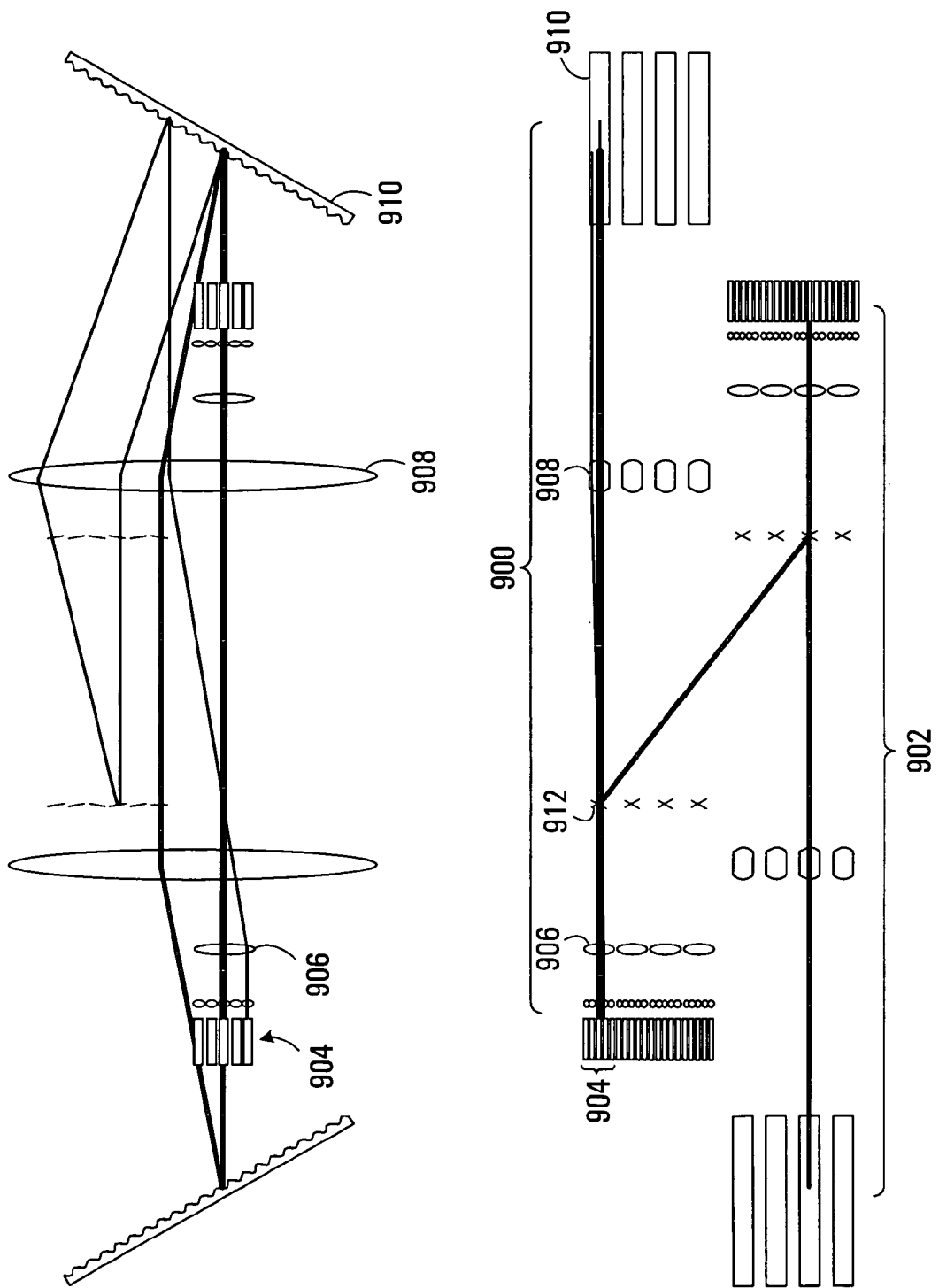
FIG. 9 shows top and side views of a WXC/ROADM provided by an embodiment of the invention with a large number of add/drop ports device using free-space optics and MEMS switching elements, in which each optical port has 25 local add/drop ports.

FIG. 9 shows another embodiment of the invention of an integrated WXC/ROADM, in which the ROADM has a large number of ports based on MEMS+free space. This results from a two dimensional arrangement of add/drop ports for each of the dispersive arrangements. There is a similar increase in number of add/drop ports going from the embodiment in FIG. 1 to the embodiment in FIG. 2 for a wavelength switch as going from the embodiment in FIG. 6 to the embodiment in FIG. 9 for a wavelength cross-connect.

The WXC/ROADM with large number of add/drop ports as per the invention consists of a first stack 900 and a second stack 902 of wavelength switch elements.

In what follows, only one element of each type of wavelength switch element is labelled.

Each wavelength switch element comprises a two dimensional arrangement of optical ports 904 coupled through a first lens 906 and a main lens 908 to a diffraction grating 910 and an array of switching elements 912. When a light beam containing a plurality of wavelength channels is coupled to any of the optical ports, it is dispersed by the diffraction grating into a plurality of optical beams each containing one wavelength channel. These optical beams are routed to a switching element of the switching array. The wavelength switch is arranged such that there is a fixed correspondence between the wavelength channel and the switching element for all possible optical ports. This is for example possible when the diffraction grating and the array of switching elements lie substantially in the focal planes of the main lens.

The two stacks of wavelength switch elements are arranged such that the switching elements of the first stack of wavelength switches can establish an optical path back to the corresponding wavelength switch of the first stack or to any other wavelength switch in the second stack and such that the switching elements of the second stack of wavelength switches can establish an optical path back to the corresponding wavelength switch of the second stack or to any other wavelength switch in the first stack.

In operation, a plurality of optical paths can be established through the WXC/ROADM device in which light can be routed from any optical ports of any of the wavelength switch from the first stack to any of the optical ports of the corresponding wavelength switch for local add/drop or routed to any of the optical ports of any of the wavelength switches from the second stack.

In the figure, an example path is shown going from the middle port (3rd row and 3rd column) of the first of the left group of 2D arrangements of ports to the fourth row and fifth column of the first of the left group of the 2D arrangement of ports (black line turning into light grey line) and another example path is shown from the middle ports of the first of the left group of 2D arrangements of ports to the middle port of the third of the right group of 2D arrangement of ports.

Figure 10:
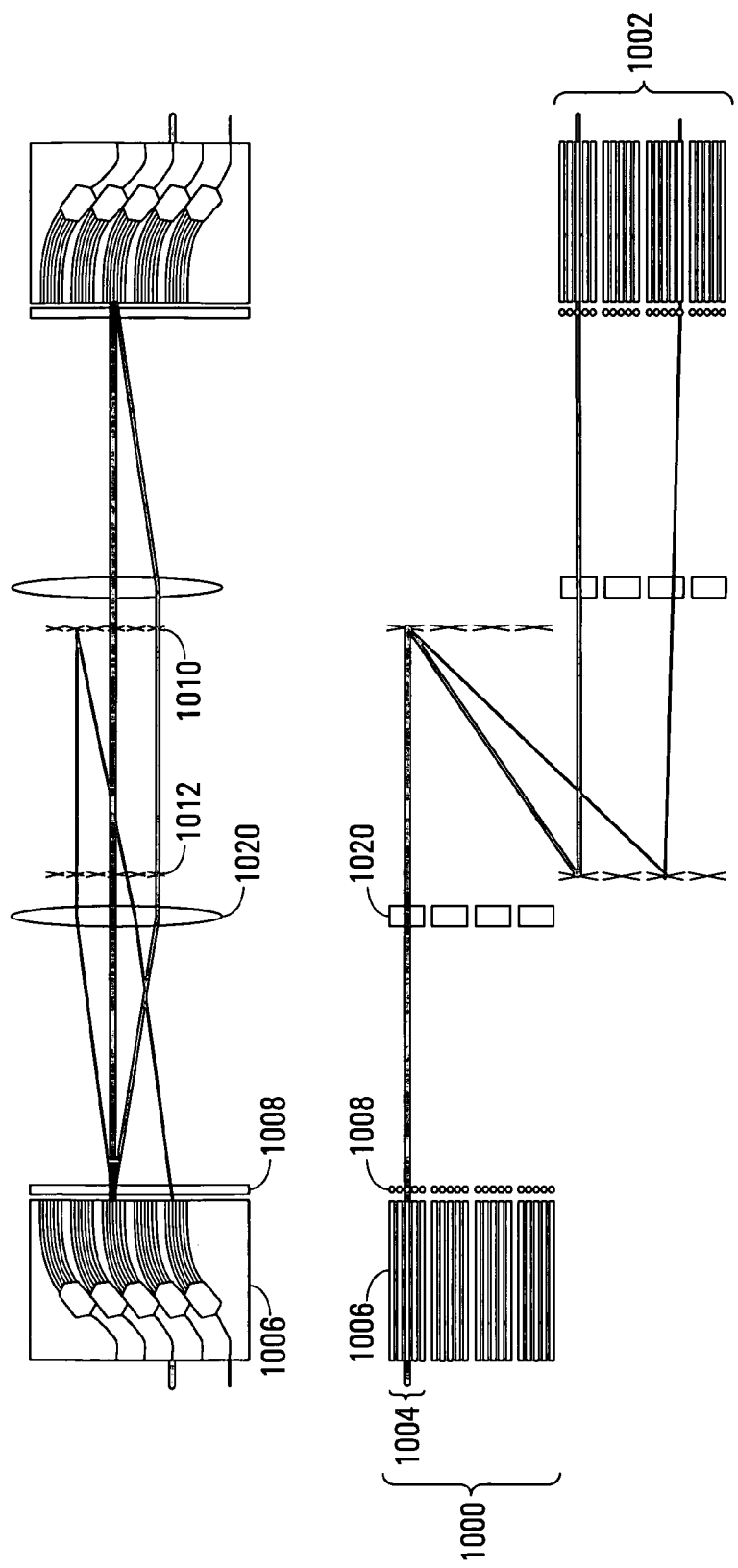
FIG. 10 shows top and side views of a WXC/ROADM provided by an embodiment of the invention with a large number of add/drop ports device using waveguide optics and MEMS switching elements, in which each optical port has 25 local add/drop ports.

FIG. 10 shows a WG embodiment of the invention shown in FIG. 9 to provide an integrated WXC/ROADM with a large number of add/drop ports. This embodiment is similar to that of FIG. 9 with the ports and diffraction gratings replaced with waveguide dispersive elements.

The device consists of a first group 1000 and a second group 1002 of stacks of waveguide devices. Each waveguide device comprises an array of at least one waveguide based dispersive element. For each stack of waveguide device e.g. stack 1004, there is provided an array of switching elements 1010. For each waveguide device in each stack e.g. device 1006 of stack 1004, there is a corresponding cylindrical lens 1008 to collimate/focus light beams emitted/received from the waveguide device in the plane of the waveguide substrate and to create an optical path from the waveguide device to the array of switching elements corresponding to their stack. For each waveguide device, there is further provided a corresponding main cylindrical lens 1020 to focus/collimate light beams emitted/received from the waveguide device in the dispersion plane. These main cylindrical lenses can be replaced by a single bigger main cylindrical lens for each waveguide device or for each stack.

The first switching elements 1010 are arranged such that an optical path can be established from any of the optical ports of any waveguide device of any stacks of the first group 1000 to either any of the optical ports of any waveguide device in the same stack of the first group 1000 or to any of the optical ports of any waveguide device of any stacks of the second group 1002. The second switching elements 1012 are arranged such that an optical path can be established from any of the optical ports of any waveguide device of any stacks of the second group 1002 to either any of the optical ports of any waveguide device in the same stack of the second group 1002 or to any of the optical ports of any waveguide device of any stacks of the first group 1000.

Figure 11:
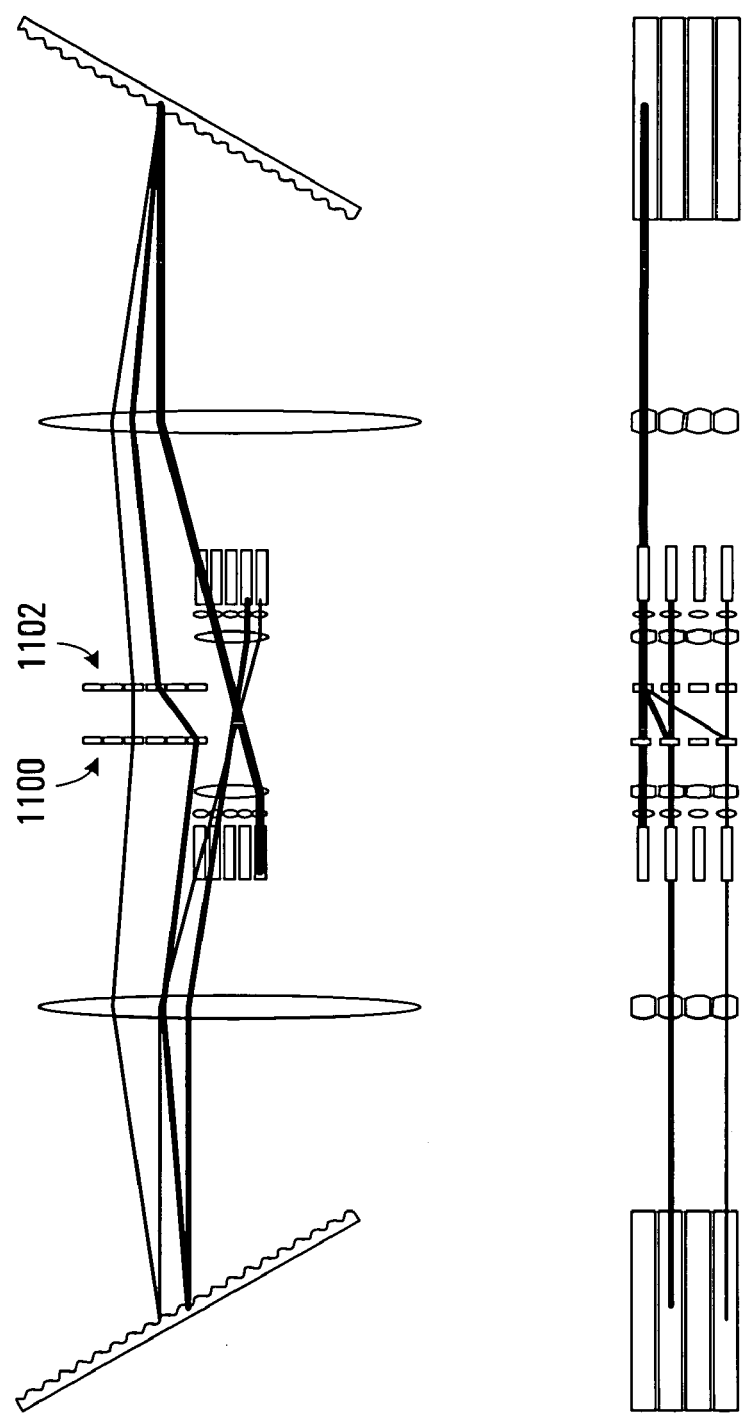
FIG. 11 shows top and side views of another embodiment of a WXC/ROADM device as per the invention using transmissive switching elements and waveguide optics, in which each optical port has 5 local add/drop ports.

FIG. 11 shows an alternate embodiment as per the invention similar in functionality and mode of operation to FIG. 6 in which the first 1100 and second array 1102 of switching means are transmissive beam steering elements.

Figure 12:
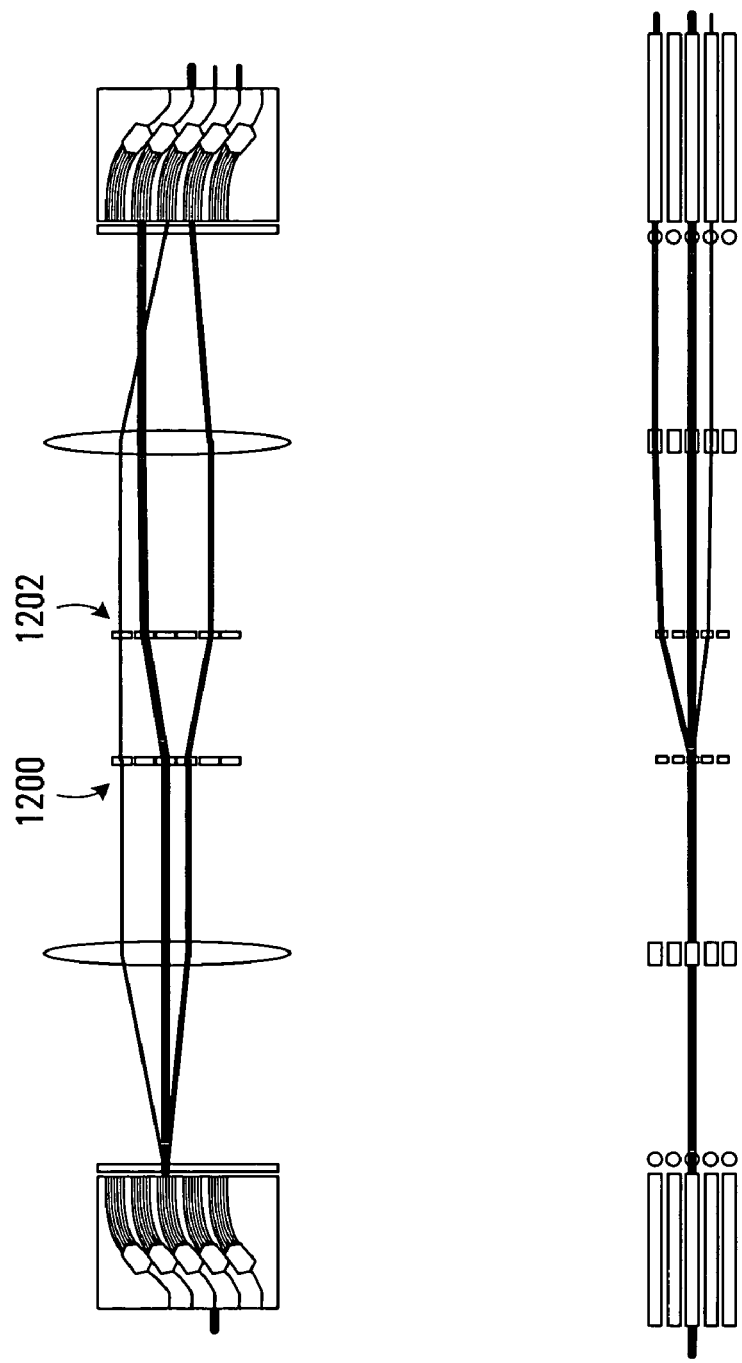
FIG. 12 illustrates top and side view of another embodiment of a WXC/ROADM device of the present invention using transmissive beam steering elements.

FIG. 12 shows an alternate embodiment as per the invention similar in functionality and mode of operation to FIG. 8 in which the first 1200 and second array 1202 of switching means are transmissive beam steering elements.

The embodiments featuring waveguide dispersive elements are shown to include integrated port coupling optics. Alternatively, the coupling optics can be realized with separate micro-optics coupling schemes.

The invention is not intended to be limited to the above mentioned specific embodiments but should rather be understood as being within the scope of the appended claims.

The invention claimed is:

1. A wavelength selective switch comprising:
   a two dimensional array of N×N optical ports including an input port for launching a wavelength division multiplexed (WDM) signal with a plurality of wavelength channels;
   a first bulk optical element having optical power and having a first focal plane and a second focal plane;
   a second bulk optical element having optical power and having third focal plane and a fourth plane, the third focal plane being substantially coplanar with said second focal plane;
   a dispersive element substantially in the fourth focal plane for dispersing the WDM signal in a dispersion plane; and
   an array of switching elements substantially in the third focal plane, each switching element tiltable in both the dispersion plane and a plane perpendicular to the dispersion plane for selectively redirecting wavelength channels both in the dispersion plane and in planes perpendicular to the dispersion plane to alternate locations on the dispersive element;
   wherein each wavelength of the WDM signal entering at one of said array of optical ports is individually switchable to any of the optical ports through appropriate control of the array of switching elements via the dispersive element.

2. A wavelength selective switch according to claim 1 wherein the switching elements are MEMS switching elements.

3. A wavelength selective switch according to claim 1 wherein the switching elements are transmissive.

4. A wavelength selective switch according to claim 1 wherein the first bulk optical element is selected from a group consisting of a lens, a curved mirror, an assembly of lenses and mirrors, and an assembly of lenses, mirrors and a curved mirror.

5. A wavelength selective switch according to claim 1 wherein the second bulk optical element is selected from a group consisting of a lens, a curved mirror, an assembly of lenses and mirrors, and an assembly of lenses, mirrors and a curved mirror.

6. A wavelength selective switch according to claim 1, wherein the dispersive element is selected from a group consisting of: a reflective diffraction grating, a transmissive diffraction grating, and prisms.

7. An optical wavelength switch comprising:
- a telescope arrangement comprising a coupling lens and a main lens, the main lens having a first focal plane substantially coinciding with a focal plane of the coupling lens;
- a two dimensional array of optical ports optically coupled to the coupling lens, the two dimensional array of optical ports having a first port for launching an input optical signal and a plurality of second ports arranged in a square;
- a dispersive element disposed substantially in a second focal plane of the main lens for dispersing the input optical signal in a dispersion plane; and
- an array of switching elements disposed substantially in the first focal plane, each switching element tiltable in both the dispersion plane and a plane perpendicular to the dispersion plane;
- wherein the ports, the telescope arrangement, the dispersive elements, and the switching elements being arranged such that:
  a) a multi-wavelength signal entering at the first port propagates through the telescope arrangement to the dispersive element where the multi-wavelength signal is demultiplexed into a plurality of wavelength channels;
  b) each wavelength channel after demultiplexing propagates through the main lens to a respective switching element of the plurality of switching elements; and
  c) each switching element is individually controllable to reflect the wavelength channel to a selected one of the second ports via a path comprising in sequence the main lens, the dispersive element, the main lens, and the coupling lens.

8. The optical wavelength switch of claim 7 wherein the two dimensional array of optical ports, the coupling lens, the main lens, and the dispersive element are all disposed in a substantially co-axial manner.

9. The optical wavelength switch of claim 7 wherein the dispersive element is a reflective diffraction grating.

10. The optical wavelength switch of claim 7 wherein the array of switching elements is an array of MEMS switching elements.

11. The optical wavelength switch of claim 7 wherein the two dimensional array of ports is arranged in a square, and the first port is in the middle of the square.

12. The optical wavelength switch of claim 7 wherein the switch is further adapted to allow any wavelength channel to be switched back to the first port, the switch further comprising: a circulator external to the first port that allows the multi-wavelength signal to enter the first port, and also allows optical wavelength channels to be switched to the first port without interfering with the multi-wavelength signal.

* * * * *